United States Patent [19]

Bach

[11] 4,115,503

[45] Sep. 19, 1978

[54] NOVEL PROCESS FOR THE PREPARATION OF FIBER OF ARYLENE OXADIAZOLE/ARYLENE N-ALKYLHYDRAZIDE COPOLYMER

[75] Inventor: Hartwig C. Bach, Pensacola, Fla.

[73] Assignee: Monsanto Company, St. Louis, Mo.

[21] Appl. No.: 520,503

[22] Filed: Nov. 4, 1974

Related U.S. Application Data

[63] Continuation-in-part of Ser. No. 390,667, Aug. 22, 1973, abandoned, and a continuation of Ser. No. 202,590, Nov. 26, 1971, abandoned, and Ser. No. 422,041, Dec. 5, 1973, abandoned, and a continuation of Ser. No. 202,669, Nov. 26, 1971, abandoned.

[51] Int. Cl.$^2$ .............................................. D01F 7/00
[52] U.S. Cl. ............................... 264/184; 264/210 F; 264/233
[58] Field of Search ................... 264/184, 210 F, 233; 260/78.4

[56] References Cited

U.S. PATENT DOCUMENTS

| | | | |
|---|---|---|---|
| 3,414,645 | 12/1968 | Morgan | 264/210 F |
| 3,632,548 | 1/1972 | Preston | 260/32.6 N |
| 3,642,706 | 2/1972 | Morgan | 264/184 |
| 3,644,283 | 2/1972 | Bach | 260/47 CZ |
| 3,660,361 | 5/1972 | Bach | 260/78 R |
| 3,671,542 | 6/1972 | Kwolek | 260/30.8 R |
| 3,673,143 | 6/1972 | Bair | 260/30.2 |
| 3,767,756 | 10/1973 | Blades | 264/184 |
| 3,796,693 | 3/1974 | Morgan | 260/176 F |
| 3,817,941 | 6/1974 | Bair et al. | 260/78 R |
| 3,819,587 | 6/1974 | Kwolek | 264/210 F |
| 3,886,251 | 5/1975 | Sekiguchi et al. | 264/184 |

Primary Examiner—Jay H. Woo
Attorney, Agent, or Firm—John W. Whisler

[57] ABSTRACT

Fibers of arylene oxadiazole/arylene N-alkylhydrazide copolymer and of high tensile strength are prepared by a unique solution spinning process, whereby an arylene oxadiazole/arylene N-alkyloxadiazolium hydrosulfate copolymer in sulfuric acid or oleum is extruded into an aqueous coagulation medium in which concurrently a fiber is formed and the latter-mentioned copolymer undergoes a chemical transformation to provide the first-mentioned copolymer.

10 Claims, No Drawings

NOVEL PROCESS FOR THE PREPARATION OF FIBER OF ARYLENE OXADIAZOLE/ARYLENE N-ALKYLHYDRAZIDE COPOLYMER

CROSS-REFERENCES TO RELATED APPLICATIONS

The present application is a continuation-in-part of application Ser. No. 390,667, filed Aug. 22, 1973 and abandoned, and of application Ser. No. 422,041, filed Dec. 5, 1973 and abandoned; application Ser. No. 390,667 is a continuation of application Ser. No. 202,590, filed Nov. 26, 1971 and abandoned, and application Ser. No. 422,041 is a continuation of application Ser. No. 202,669, filed Nov. 26, 1971 and abandoned.

BACKGROUND OF THE INVENTION

1. Field of the invention

This invention relates to a novel solution spinning process for preparing useful fiber of arylene oxadiazole-/arylene N-alkylhydrazide copolymers. The fiber is particularly useful in reinforcing applications such as in tire cord.

2. Description of the prior art

Imai, Journal of Applied Polymer Science, Vol. 14, pages 225-239 (January, 1970), describes solution spinning of p-phenylene oxadiazole/m-phenylene oxadiazole copolymers from sulfuric acid solutions thereof into fiber and that similar attempts to solution spin poly-p-phenylene-1,3,4-oxadiazole from sulfuric acid solutions into useful fiber were unsuccessful.

U.S. Pat. No. 3,536,651 teaches the preparation and conversion of poly(terephthalic hydrazide) fiber to poly-p-phenylene-1,3,4-oxadiazole fiber by using the process described in U.S. Pat. No. 3,238,183, that is, by heating the polyhydrazide fiber to effect intra-linear dehydration-cyclization of the hydrazide moieties to oxadiazole moieties. According to the patent disclosures poly(terephthalic hydrazide) polymer is prepared in an N-substituted amide solvent, such as hexamethylphosphoramide, and is solution spun into fiber using dimethyl sulfoxide as the spinning solvent.

U.S. Pat No. 3,642,708 teaches a process for the fabrication of shaped articles of poly-p-phenylene-1,3,4-oxadiazole by using as a precursor an oxadiazole-N-methylhydrazide copolymeric resin. The resin is allegedly prepared in fuming sulfuric acid and is stated to be significantly more soluble in common N-substituted amide solvents than is poly-(terephthalic hydrazide). The process involves shaping an article of the copolymeric resin using a solution of the resin in an organic polar solvent, then removing the solvent by drying and finally heating the shaped article om betweem 220° C. and 350° C. to convert the N-methylhydrazide units to oxadiazole units:

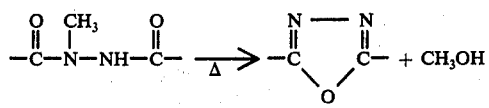

While the molecular weights (i.e. inherent viscosities) of the p-phenylene oxadiazole-N-methylhydrazide copolymeric resins illustrated in U.S. Pat. No. 3,642,708 are generally satisfactory for the fabrication of films and coatings, they are too low for the fabrication of high tensile strength fiber.

SUMMARY OF THE INVENTION

The present invention provides a novel spinning process for the preparation of fiber of high molecular weight oxadiazole/N-alkylhydrazide random copolymers consisting essentially of recurring units of the formula

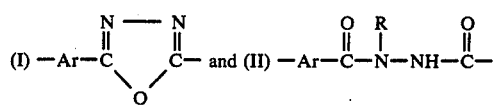

where Ar is arylene, such as

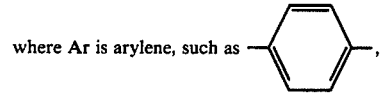

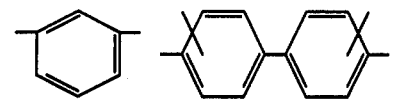

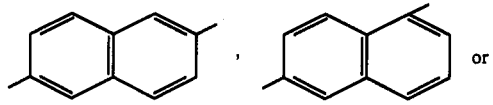

and may be the same or different in successive units, R is lower alkyl, that is, an alkyl group having from 1 to 4 carbon atoms and may be the same or different in successive units (II) of the copolymer and wherein the mole ratio of units (I) to units (II) is between 20:80 and 95:5. The novel solution spinning process of the invention comprises extruding a spinning solution, commonly referred to as a dope, consisting essentially of (1) oleum or sulfuric acid of at least 90% and preferably at least 96% concentration and (2) an alkylated polyoxidiazole consisting essentially of recurring units of the formulas

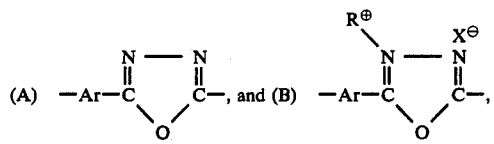

wherein $X^-$ is an anion contained in said dope, for example, anions derived from sufluric acid or oleum, such as hydrosulfate ($HOS_4^-$), sulfate and/or anions derived from hydrosulfate or sulfate anions by addition of $SO_3$ thereto, and, wherein Ar and R have the same meaning as previously defined, into an aqueous coagulation medium, such as water or aqueous sulfuric acid, to form fiber of a copolymer consisting essentially of recurring units of the formulas (I) and (II), and removing sulfuric acid from the resulting fiber. Normally occurring protonation of units (A)

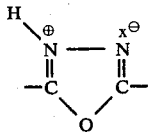

is not shown in the above formula.

The term "fiber" as used herein includes a single filament or a bundle of filaments such as a yarn.

The term "Copolymer A" when used herein refers to copolymer consisting essentially of the above-defined recurring units (A) and (B).

The term "Copolymer B" when used herein refers to copolymer consisting essentially of the above-defined recurring units (I) and (II).

The term "reaction spinning" as used herein means the extruding of a dope into a coagulation medium where the polymer component of the dope concurrently is shaped into a fiber and undergoes a ring opening chemical transformation.

The process of this invention is unusual in that it involves reaction spinning, that is, a dope is extruded into a coagulation medium where the polymer (i.e. Copolymer A) of the dope is concurrently shaped into fiber and undergoes a chemical transformation (i.e. hydrolysis) to yield an arylene oxadiazole/arylene N-alkylhydrazide copolymer (i.e. Copolymer B). In contrast, the prior art solution spinning processes used for the preparation of fiber of aromatic polymers, such as aromatic oxadiazoles, hydrazides, oxadiazole/N-methylhydrazide copolymers or polyamides, does not involve reaction spinning. The prior art processes merely involve extruding a dope into a coagulation medium where the polymer component of the dope is precipitated without any concurrent chemical transformation of the polymer occurring.

According to a preferred embodiment of the invention, the reaction spinning process described herein is used to provide fiber of Copolymer B which fiber has high tensile strength properties, that is, has a tenacity of at least 8.5 gpd and preferably at least 12 gpd with a tenacity of at least 14 gpd being particularly preferred and has an initial modulus of at least 150 gpd, and preferably at least 250 gpd with a modulus of at least 300 gpd being particularly preferred. In providing fiber of this description the Copolymer A component of the dope used in the process must have before any optical dilution of the dope an inherent viscosity as, defined hereinafter, of at least 2.0, for example, between 2 and 12, with an inherent viscosity of at least 3 being preferred. Copolymer B made according to this embodiment of the invention has limited solubility, in that; when the copolymer consists of between about 20 and about 50 mole percent of units (I), the only organic solvents which have been found to dissolve it are hexafluoroisopropanol (HFIP) and m-cresol; when the copolymer consists of between about 50 and about 70 mole percent of units (I), HFIP will generally dissolve it but m-cresol will not; and when more than about 70 mole percent of the copolymer consists of units (I), the copolymer is normally insoluble in known organic solvents including HFIP.

If one were to consider conventional solution spinning of this Copolymer B into fiber from organic solutions, neither HFIP nor m-cresol is a suitable spinning solvent. The high cost of HFIP precludes its use as a spinning solvent and, while m-cresol is a solvent for certain Copolymer B, the Copolymer will not satisfactorily coagulate therefrom in aqueous media.

DESCRIPTION OF THE PREFERRED EMBODIMENTS

The reaction spinning process of the present invention involves extruding a dope consisting essentially of oleum or sulfuric acid of at least 90% concentration and an alkylated polyarylene oxadiazole (Copolymer A) into an aqueous coagulation system or medium in which the alkylated polyarylene oxadiazole is concurrently shaped into fiber and hydrolyzed to form arylene oxadiazole/arylene N-alkylhydrazide copolymer (Copolymer B). The resulting fiber is then washed to remove sulfuric acid therefrom. Surprisingly, while Copolymer A is stable in oleum or concentrated sulfuric acid, Copolymer B rapidly degrades therein. The washed fiber may then be processed in a conventional manner, for example, dried, hot-stretched and collected. Optionally, a finish may be applied to the fiber prior to its being dried.

Suitable dopes for use in the reaction spinning process of the present invention and suitable conditions that may be used in preparing and spinning these dopes and processing the resulting fiber are discussed herein in detail.

Suitable Dopes

Dopes useful in practicing the reaction spinning process of the present invention comprise from 1 to 15 weight percent or more of Copolymer A in solution with oleum or sulfuric acid of at least 90% concentration.

The above dopes are prepared by reacting at a temperature between 80° and 170° C. reactants consisting essentially of (A) at least one aromatic dicarboxylic acid or a salt thereof or the amide or nitrile derivative thereof, (B) at least one dialkyl ester of an aromatic dicarboxylic acid and (C) hydrazine or the hydrate thereof or an acid salt thereof or mixtures thereof, in oleum, that is, fuming sulfuric acid containing sufficient sulfur trioxide (i.e., $SO_3$) to take up the water formed by the reaction, e.g. 10 to 40 weight percent $SO_3$ or higher, wherein the mole ratio of (A) to (B) is from 95:5 to 20:80 and preferably is from 40:60 to 80:20 with a ratio of between 40:60 and 60:40 being particularly preferred, and wherein the mole ratio of (C) to [(A) + (B)] is at least 1:1. If desired, higher or lower reaction temperatures may be used. At mole ratios of (A) : (B) where (A) is greater than about 95 mole percent or less than about 20 mole percent, the resulting dope is not easily processed into useful fiber. Preferably (C) is present in a molar excess of a mole ratio of 1:1, (C) : (A) + (B), in an amount of at least 0.5 mole percent, for example, about 0.8 to 4.0 mole percent excess.

The solution resulting from polymerization of (A), (B) and (C) in oleum, if necessary, is diluted with sulfuric acid or oleum to provide a dope of a suitable viscosity for solution spinning. This solution, diluted or undiluted, is then used as the spinning dope in practicing the reaction spinning process of the invention.

Preferred aromatic dicarboxylic acid reactants for use in preparing the dopes are terephthalic acid, isophthalic acid or mixtures thereof. When mixtures are used, any mole ratio of terephthalic acid to isophthalic acid may be employed, for example 99:1 to 1:99, with 75:25 to 90:10 being preferred. Instead of the acid, the amide or nitrile derivative thereof can be used or a salt thereof, for example, the diammonium salt.

Preferred dialkyl esters of aromatic dicaroxylic acids for use in preparing the dopes are the methyl or ethyl esters of terephthalic acid or isophthalic acid or mixtures thereof with the methyl esters being particularly preferred. When mixtures of esters of terephthalic and isophthalic acids are empolyed, the mole ratio thereof may range from 99:1 to 75:25, respectively, with a ratio of about 90:10 being preferred.

In preparing the dopes, the hydrazine reactant is preferably used in the form of an acid salt thereof, for example, hydrazine sulfate, hydrazine phosphate, hydrazine hydrochloride, with hydrazine sulfate being the preferred salt.

Preferably the dopes are prepared by first dissolving the reactants in oleum at a temperature below about 80° C., e.g., 25° to 70° C., at which temperature the reaction rate is very low and then heating the solution to a temperature above about 100° C., e.g., 120° C. kto 150° C. or higher, at which temperature the reaction rate is quite high. By preparing the dopes by this technique, the amount of gel formation in the resulting solutions is minimized or eliminated.

Precipitation and isolation of Polymer A from the dope results in its chemical transformation to Polymer B via hydrolysis. As previously stated however, Polymer B when added to sulfuric acid or oleum rapidly degrades.

According to the previously mentioned preferred embodiment of the invention fiber of Copolymer B, wherein Ar is

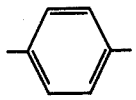

and R is —$CH_3$, is provided which has a tenacity and an initial modulus of at least 8.5 and 150 gpd, respectively. The dope used in making this high strength fiber is prepared by polymerizing terephthalic acid (TA), dimethyl terephthalate (DMT) and hydrazine sulfate (Hy) in oleum under conditions carefully selected to provide a dope exhibiting a polymer inherent viscosity (as hereinafter defined) of at least 2.0 and preferably between 3.0 and 12.0 before any optional dilution of the dope. In preparing this dope the conditions which have a particular influence on the strength, that is, tenacity and initial modulus, of fiber prepared therefrom are: the reaction temperature, reaction time and the amounts of starting materials used in preparing the dope.

Reaction temperature and time: In preparing the dopes, the reaction temperature is related to the reaction time in the usual manner, that is, an increase of about 10° C. doubles the reaction rate. When high strength fibers are desired, the reaction is conducted at a temperature between about 120° C. and 150° C. or higher for a period of from 3 to 10 hours, for example, at a temperature of 140° C. for 6 hours. Initially, for example during the first hour of the reaction when using a reaction temperature of 140° C. and a TA to DMT mole ratio of 1:1, the product formed is almost entirely poly-p-phenylene-1,3,4-oxadiazole. Therefore, however, methylation of this product occurs to provide the desired partially methylated oxadiazole (Copolymer A). Thus, the polymerization reactions involved in the formation of the partially methylated polyoxadiazole may be considered a two stage reaction. Accordingly, the mole ratio of the two repeating units of Copolymer A contained in the resulting dope depends on the reaction time and reaction temperature as well as the mole ratio of TA to SMT initially present.

Mole ratio of reactants; High strength fibers of Copolymer B are obtained from dopes that are prepared by polymerizing TA, DMT and Hy in fuming sulfuric acid using a reaction temperature of between 120° C. and 150° C., a reaction time between 4 and 6 hours and the following mole ratios: TA to DMT of 1:1; Hy to (TA + DMT) of 0.5% to 4.0% in excess of a 1:1 mole ratio; and $SO_3$ to (TA + DMT) of 3:1 to 8:1. Under these conditions the fiber prepared from the dope consist of a random copolymer made up of phenylene-1,3,4-oxadiazole units and phenylene-N-methylhydrazide units in a mole ratio of about 1:1.

Slight changes in the mole ratio of TA:DMT do not significantly affect the properties of the resulting fibers. However, in general as the TA content of the TA:DMT ratio increases from a 1:1 ratio the extensibility of the resulting fibers decreases and as the DMT content of the ratio increases from a 1:1 ratio the tensile properties of the resulting fibers decrease.

For a given set of reactants and reaction conditions Copolymer A of maximum inherent viscosity is provided by using a mole ratio of $SO_3$:(TA+DMT) of about 5:1. This mole ratio corresponds to providing a polymer concentration (as hereinafter defined) of about 6.8% in 20% oleum, 9.7% in 30% oleum, 12.2% in 40% oleum. and 17.3% in 65% oleum. When lesser or greater amounts of $SO_3$ are present, a reduction in the inherent viscosity of Copolymer A is observed. On the other hand, the Brookfield viscosity of the resulting polymer solution increases exponentially with increasing amounts of $SO_3$ present. Therefore, when a Copolymer A of maximum inherent viscosity is prepared, it is usually necessary to dilute the resulting solutions with oleum or $H_2SO_4$ to provide a dope of a suitable Brookfield viscosity for spinning.

For each particular set of reaction conditions there is an optimum amount of excess Hy which when present during polymerization provides Copolymer A of optimum inherent viscosity. This optimum amount of excess Hy increases in the reaction temperature. When less than the optimum amount of excess Hy is present during polymerization, the inherent viscosity of the resulting Copolymer A decreases with decreasing amounts of Hy. When more than the optimum amount of Hy is present, Copolymer A becomes less linear with increasing amounts of Hy. Decreases in the linearity and/or inherent viscosity of the polymer results in losses in the tensile strength of the fiber.

The reaction conditions may be selected so that the resulting polymer solution may be used directly as the spinning solution without silution thereof. Under such conditions the tensile properties of the fibers are usually somewhat lower than are attainable with dilution since the selection of reaction conditions in this instance must be compromised in order to provide a polymer solution of an appropriate viscosity for spinning. Undiluted solutions may be obtained, for example, by providing for the presence of less than the optimum amounts of solids during polymerization, e.g. by using a higher $SO_3$:-(TA+DMT) ratio. Likewise, when the polymer solution is to be diluted with $H_2SO_4$ of 90% to 98% concentration a higher $SO_3$:(TA+DMT) ratio may be used in preparing the polymer solution than is used when the solution is to be diluted with oleum.

SPINNING AND PROCESSING CONDITIONS

In practicing the reaction spinning process of the present invention a fiber of Copolymer B is formed by extruding a dope of the type described above from one or more orifices of a spinneret into an aqueous coagulation system. The spinneret may be immersed in the coagulation system or it may be spaced a short distance, e.g. ⅛ to 2 inches (0.32 to 5.1 cm.) or more above the coagulation system. The fiber formed in the coagulation system is withdrawn therefrom, thoroughly washed with water alone or combinations of alkaline solution and water to remove $H_2SO_4$ therefrom, dried, hot stretched and collected. Optionally, a finish may be applied to the fiber prior to its being dried.

The reaction spinning process of the present invention is unique in that it involves the concurrent shaping of the extruded Copolymer A into fiber and the chemical transformation thereof into copolymer B. Since Copolymer B formed in the coagulation system tends to degrade when it remains in contact with $H_2SO_4$, the resulting fiber is washed to remove $H_2SO_4$ therefrom. The presence of $H_2SO_4$ in the aqueous coagulation system is unavoidable since the spinning dope solvent is either oleum or $H_2SO_4$ of at least 90% concentration. Moreover, the coagulation system is preferably aqueous $H_2SO_4$.

Another unique feature of the process of the present invention is the ability to attain therewith, if desired, a high total stretch of the fiber. Total stretch is related to the total draw ration which represents the ratio of the windup speed of the fiber to the extrusion speed of the dope. The total draw ratio in the process of the present invention is typically 40–80 and may be as high as 150 or higher. The maximum attainable draw ratio for a given process is normally limited by fiber breakage. High windup speeds are desirable from the standpoint of economics, i.e. production rates per spinning machine, capital investment, etc. Windup speeds as high as 2500 ft. (762 m.)/min. are easily attainable with the process described herein.

As in any spinning process, the tensile properties of fiber prepared by the reaction spinning process of the present invention are influenced by the conditions used in spinning and processing the fiber. These conditions are discussed in the following sections.

Spinnerets: Spinnerets and other apparatus which are in contact with $H_2SO_4$ should be made out of materials resistant thereto. The diameter of the orifices is usually less than 30 mils (0.762 mm.). In general, the diameter of the orifices, the length of the capillaries and the ratio of the length to diameter are not critical when extruding solutions having a Brookfield viscosity of about 2500 poise or less. However, when extruding solutions having a Brookfield viscosity of greater than 2500 poise, spinnerets having a tapered entrance, e.g. a conical entrance, to each orifice should be used to minimize any dope fracture that might otherwise occur. Dope fracture usually occurs when extruding highly viscous solutions of high molecular weight polymer from conventional straightwalled spinneret orifices and is characterized by the presence of turbulent flow of a dope at or near the entrance of an orifice. Turbulence of the dope causes cavitation and erratic flow of the dopes through and from the spinneret capillary which results in fiber of inferior quality. Although dope fracture may be eliminated by other means, such as, by reducing the viscosity of the dope or by slowing down the extrusion speed, these means generally result either in a loss of productivity or a reduction in the physical properties of the fiber or both.

Spinneret placement: The spinneret may be immersed in the coagulating system, i.e. wet spinning, or it may be placed a short distance above the coagulating system, i.e. dry jet-wet spinning.

Extrusion speed: The extrusion speed or velocity is the average velocity of the dope in the spinneret capillary as calculated from the volume of dope passing through an orifice per unit time and the cross-sectional area of the orifice and may range from 15 ft./min. (fpm) (4.6 meters/min.-mpm) or lower to 500 fpm (152.4 mpm) or higher. The minimum value for a given dope and orifice is determined by the ability of the dope to jet continuously and cleanly.

Dope temperature: The temperature of the dope being extruded is generally between about 20° C. and 140° C. and is controlled to provide a dope that jets continuously and cleanly.

Coagulating bath: The coagulating bath is an aqueous system. Useful aqueous systems range from pure water to systems containing about 65% sulfuric acid or sulfate salts such as ammonium sulfate. Additives, if desired, may be present in the systems. Preferably, the system consists of aqueous $H_2SO_4$ wherein the concentration of $H_2SO_4$ is greater than 40%, e.g. between 40% and 60%. At $H_2SO_4$ concentrations of greater than 75% adequate coagulation of the polymer may not occur. Satisfactory results are obtained with coagulating systems ranging from pure water to aqueous $H_2SO_4$ (60%). The temperature of the coagulation bath is not critical. Generally, the temperature of the bath may range from 0° C. to 95° C. or higher with room temperature being a convenient temperature to employ. Use of higher temperatures, that is temperatures above room tends to enhance the coagulation. However, if the temperature of the coagulating system is too high, hydrolysis of fiber tends to occur and the resulting fiber is difficult to collect without breaking it.

Jet stretch factor: Jet stretch factor as expressed herein is the ratio of the velocity of the fiber as it passes over the first godet (roll), i.e., as it is withdrawn from the coagulation bath to the extrusion velocity. Typically, the first godet withdraws the fiber from the coagulation bath and advances it toward the washing baths. The jet stretch factor may vary from 1:1 or lower to 25:1 or higher. The minimum jet stretch factor to be used with a particular dope and orifice is determined by the ability to form a fiber of relatively uniform denier and of desired physical properties and the maximum jet stretch factor to be used is limited by the speed at which the fiber can be pulled away without breakage. In general, when the jet stretch factor is increased from a low value, the tenacity of the processed fiber increases through a maximum value and thereafter decreases. The optimum jet stretch factor therefore is that factor which provides a fiber of maximum tenacity, for a given orifice size and dope, for example, an optimum jet stretch factor has been found to be about 8 for a spinneret having 12-mil orifices.

Washing: Copolymer B tends to degrade in the presence of $H_2SO_4$. The degree of Copolymer B degradation in the presence of sulfuric acid is a function of sulfuric acid concentration, time in contact therewith, shape of Copolymer B, that is surface to volume ratio, etc. Therefore sulfuric acid is removed from the coagulated fiber by washing it and, preferably, by washing it as quickly as possible so as to prevent any loss or significant loss in the tensile strength thereof. Of course, in certain end use applications of the fiber, a slight loss in the tensile properties of the fiber may be tolerable. Water alone and, preferably combinations of alkaline solutions (e.g. aqueous sodium carbonate) and water are used to neutralize and remove $H_2SO_4$ from the fiber. Satisfactory removal of $H_2SO_4$ from the fiber has been accomplished by washing the fiber immediately after its withdrawal from the coagulation system by using a series of wash baths where the first, third and fourth wash baths consist of water and the second wash bath consists of aqueous $Na_2CO_3$. Good results were obtained when the first, third and fourth wash baths were maintained at high temperatures, e.g. between 75° C. and 100° C. High wash bath temperatures (e.g. 95° C.) are preferred since the diffusion rate of liquid from the polymer is greater at higher temperatures.

Cascade factor: A relaxation or stretch may be imparted to the fiber subsequent to the jet stretch and prior to the hot stretch thereof, e.g. during the washing thereof. The amount of this relaxation or stretch imparted to the fiber is referred to as the cascade factor and is expressed as the ratio of the velocity of the filament just prior to and just after the cascade. The cascade stretch or relaxation further conditions the fiber and may vary from less than 1 to 5 or more, e.g. from 0.3 to 3.0. By application of a cascade relaxation, i.e. a cascade factor greater than zero and less than one, a higher total or overall draw of the fiber is obtained than when a cascade relaxation is omitted or a cascade stretch is employed. A maximum total draw of the fiber is obtained when the cascade factor ranges from 0.6 to 0.8. Total draw ratio, as expressed herein, is the ratio of the windup velocity of the fiber to the extrusion velocity.

Finish: Optionally, an appropriate finish may be applied to the fiber following the washing thereof.

Drying: The thoroughly washed fiber which, optionally, has a finish applied thereto may be conveniently dried by passing it over heated rolls, for example, at a temperature between 110° C. and 140° C.

Hot stretch factor: After the fiber is dried, it may be stretched several times its length, i.e., more than twice its length while in contact with a heated environment, such as heated gas (e.g. nitrogen or air) or a heated metal surface (e.g. draw pin, roll, hot shoe), to further enhance its properties, in particular, to increase its tenacity and initial modulus. The hot stretch factor is expressed as the ratio of the velocity of the fiber as it is being collected to the velocity of the fiber as it is being dried. The hot stretch factor may range from 1 to 30. Generally when the hot stretch factor is increased from a low value, the tenacity of the resulting fiber increases through a maximum value and thereafter decreases. The optimum hot stretch factor is that factor which provides a fiber of maximum tenacity.

Total draw: Total draw of the fiber has been previously defined and may range from for example, 6 to 360. A total draw of about 64 provides fiber of high tenacity and initial modulus when using a 12 mil 0.305 mm.) orifice with a dope having a polymer concentration of about 3%.

MEASUREMENTS AND TESTS

The concentration of polymer in terms of weight percentage for a given dope used in the reaction spinning process of this invention is defined as the concentration that would result if the polymer in the dope were Copolymer B having a mole ratio of units (I) to units (II) corresponding to the mole ratio of dicarboxylic acid (e.g. TA) to dialkyl ester (e.g. DMT) used in preparing the dope. Of course the dopes do not actually contain Copolymer B and the mole ratio of units (I) to units (II) of fiber prepared therefrom may not correspond to the mole ratio of diacid to diester used in their preparation. The calculated concentration of the polymer of the dopes is used in obtaining inherent viscosity values and in controlling or monitoring the polymer concentration during preparation of a dope.

Inherent Viscosity: Inherent viscosity ($\eta_{inh}$) values, when given herein, are measured at 25° C. and are defined by the following equation:

$$\eta_{inh} = \frac{\ln RV}{C}$$

where C represents a concentration of 0.2 gram of polymer per 100 ml of solvent of the polymer solution and RV represents relative viscosity. The relative viscosity (RV) is determined by dividing the flow time in a capillary viscometer of a dilute polymer solution by the flow time for the pure solvent. The polymer solution used for the inherent viscosity determinations of the copolymer in the dope is obtained by dilution of a portion of the reaction product obtained in the preparation of the dope with concentrated sulfuric acid. The polymer concentration, as defined above, of the reaction product is determined and then a portion or sample of this product is diluted with an appropriate amount of concentrated sulfuric acid to obtain a solution having a polymer concentration of 0.2 g of polymer per 100 ml of solvent. The polymer solution used for the inherent viscosity determinations of Copolymer B is obtained by dissolving an appropriate amount of Copolymer B in hexafluoroisopropanol.

Tenacity (breaking tenacity) (T), elongation (breaking elongation) (E), initial modulus (M) and toughness (Tg) are obtained on an Instron Tester (Instron Engineering Corporation, Canton, Mass.) providing a constant extension rate of 10% per minute with a guage length of 10 cm being used. The measured denier of the fiber, test conditions and sample identifications are fed to a computer before the start of the test. The computer records the load-elongation curve of the sample until the sample is broken, calculates T (in units of grams per denier, gpd), E (in units of percentage, %), M (in terms of gpd) and Tg (in units of gram centimeter per denier centimeter, gcm/den. cm) of the sample from the curve and fed information and provides a printout sheet with the calculated T, E, M and Tg values recorded thereon.

Chemical Analysis of Copolymer B: Chemical analysis of Copolymer B is accomplished according to the following procedure:

A polymer of fiber sample (0.6 g.) is refluxed for 3 hours in 15 ml. of 62% $H_2SO_4$. Then, 70 ml. of water is added, the mixture is cooled to 25° C. and filtered. The filtered-off precipitate is washed with water and the combined filtrate is diluted to a volume of 200 ml. with water. A 20 ml. aliquot of this solution is cooled to 0° C. and neutralized with sodium hydroxide to a pH of 6-9.

Acetylacetone (0.1 ml.) is added and the mixture is agitated for 1 hour. The quantity of the pyrazoles formed from the hydrazine and methylhydrazine produced during hydrolysis is determined by quantitative gas chromatography on a 10% FFAP on Chromosorb column. The molar ratio of hydrazine to methylhydrazine thus determined indicates the oxadiazole/N-methyl hydrazide copolymer ratio.

Proton Nuclear Magnetic Resonance (NMR) Analysis of Copolymer B: NMR analysis of Copolymer B is accomplished by the following procedure:

A fiber sample is dissolved in concentrated sulfuric acid at a 5–10% concentration effecting polymer hydrolysis. The aromatic (9.7 – 8.3 ppm) and methyl (4.3 – 3.7 ppm) proton absorption regions are scanned at 30° C. and referenced to tetramethyl silane at 0 ppm. The molar percentage of N-methyl hydrazide units is derived from the relative absorption intensities of the methyl to the aromatic protons by the following formula:

$$\% \text{ N-Methyl hydrazide} = \frac{\frac{\text{Methyl Intensity}}{3}}{\frac{\text{Aromatic Intensity}}{4}} \times 100$$

The following nonlimitive examples are given to further illustrate the invention.

Examples 1 – 12 illustrate fiber preparation by the reaction spinning process of the present invention. In these Examples various dope compositions, coagulating systems and conditions are illustrated.

EXAMPLE 1

This example illustrates the preparation of fiber of p-phenylene oxadiazole/N-methyl terephthalhydrazide copolymer, wherein a 90 to 10 molar ratio of terephthalic acid to dimethyl terephthalate and a 1.25% molar excess of hydrazine sulfate were used in preparing the dope from which fiber was reaction spun. 984 g. (515 ml.) of fuming sulfuric acid (30% SO₃) was added with stirring at room temperature to a mixture of 58.18 g. of terephthalic acid, 7.55 g. of dimethylterephthalate, and 51.26 g. of hydrazine sulfate. The resulting reaction mixture was then heated to 120° C. and maintained at this temperature for 6 hours. During this period the viscosity of the solution increased greatly and a total of 200 g. of fuming sulfuric acid (30% SO₃) and 100 g. of concentrated sulfuric acid were added to moderate the solution viscosity. The polymer in the resulting dope had an inherent viscosity of 3.8. This dope was reaction spun to fiber by extruding it through a 6.5 mil (.1651 mm.), 5-hole spinneret into a coagulation bath consisting of 8% aqueous sulfuric acid maintained at 23° C. The spinneret was heated to 120° C. and kept ½ inch (12.7 mm.) above the coagulation liquid. After passage under a guide in the bath, the fiber was passed over a water wash roll, a neutralizing roll rotating in an aqueous 4% solution of sodium carbonate, through a water bath at 95° C., over another wash roll, a steam-heated drying roll and finally hot stretched over a hot-shoe at 383° C. and wound onto a bobbin at a speed of 138 ft. (42.1 m.)/min. The fiber had the following tensile properties.

| | |
|---|---|
| Tenacity: | 5.7 gpd |
| Elongation: | 3.7% |
| Modulus: | 202 gpd |

EXAMPLE 2

A p-phenylene-oxadiazole/N-methyl terephthalhydrazide copolymer ($\eta_{inh} = 3.3$) was prepared in fuming sulfuric acid (30% SO₃) similar to the procedure of Example 1 by using a 85 to 15 molar ratio of terephthalic acid (54.94 g.) to dimethylterephthalate (11.33 g.) and a 1.26% molar excess of hydrazine sulfate (51.26 g.) with a total of 1084 g. of fuming sulfuric acid (30% SO₃) as solvent and coreagent to provide a dope. This dope was reaction spun into fiber as in Example 1 using a spinneret temperature of 90° C. and 13% aqueous sulfuric acid at 25° C. as the coagulation medium. The fiber, wound up at a speed of 454 ft. (138.4 m.)/min., had the following properties.

| | |
|---|---|
| Tenacity: | 7.8 gpd |
| Elongation: | 3.7% |
| Modulus: | 231 gpd |

EXAMPLE 3

A p-phenylene oxadiazole/N-methyl terephthalhydrazide copolymer ($\eta_{inh} = 3.9$) was prepared at 120° C. in fuming sulfuric acid (30% SO₃) similar to the procedure of Example 1 using a 80 to 20 molar ratio of terephthalic acid (51.71 g.) to dimethylterephthalate (12.93 g.) and a 1.9% molar excess of hydrazine sulfate (52.62 g.) to provide a dope. A total of 1184 g. of fuming sulfuric acid (30% SO₃) and 100 g. of concentrated sulfuric acid was used for the reaction. The resulting dope was reaction spun to fiber by extruding it through a 6.5 mil (.1651 mm.), 5-hole spinneret at 60° C. and an air space of ½ inch (12.7 mm.) into water at 25° C. as the coagulation medium. After undergoing a similar spinning procedure as in Example 1, the fiber, wound up at 247 ft. (75.3 m.)/min., had the following properties.

| | |
|---|---|
| Tenacity: | 7.3 gpd |
| Elongation: | 4.2% |
| Modulus: | 231 gpd |

EXAMPLE 4

A p-phenylene oxadiazole/N-methyl terephthalhydrazide copolymer ($\eta_{inh} = 3.5$) was prepared at 120° C. in fuming sulfuric acid (30% SO₃) similar to the procedure of Example 1 using a 75 to 25 molar ratio of terephthalic acid (48.48 g.) to dimethylterephthalate (18.88 g.) with a 1.26% molar excess of hydrazine sulfate (51.26 g.) to provide a dope. A total of 1184 g. of fuming sulfuric acid (30% SO₃) was used for the reaction. The resulting dope was reaction spun to fiber by extruding it through a 6 mil (.1524 mm.), 10-hole spinneret into an air space of ½ inch (12.7 mm.) and then into 14% aqueous sulfuric acid at 25° C. After a similar spinning procedure as in Example 1, the fiber was wound up on a bobbin at a speed of 434 ft. (132.3 m.)/min. The fiber had the following properties.

| | |
|---|---|
| Tenacity: | 9.5 gpd |
| Elongation: | 4.0% |

| | |
|---|---|
| -continued | |
| Modulus: | 301 gpd |

EXAMPLE 5

A p-phenylene oxadiazole/N-methyl terephthalhydrazide copolymer ($\eta_{inh} = 2.9$) was prepared at 120° C. in fuming sulfuric acid (30% SO$_3$) similar to the procedure of Example 1 using a 70 to 30 molar ratio of terephthalic acid (45.25 g.) to dimethylterephthalate (22.66 g.) with a molar excess of hydrazine sulfate (51.21 g.) of 1.16% to provide a dope. A total of 1084 g. of fuming sulfuric acid (30% SO$_3$) was used for the reaction. The resulting dope was reaction spun to fiber at a speed of 420 ft. (128 m.)/min. as in Example 1 using a 6.5 mil (0.1651 mm.) 5-hole spinneret at 80°–100° C., a ½ inch (12.7 mm.) air space and water as the coagulation medium. The fiber had the following properties.

| | |
|---|---|
| Tenacity: | 8.5 gpd |
| Elongation: | 4.1% |
| Modulus: | 262 gpd |

EXAMPLE 6

A p-phenylene oxadiazole/N-methyl terephthalhydrazide copolymer ($\eta_{inh} = 2.6$) was prepared in fuming sulfuric acid (30% SO$_3$) similar to the procedure of Example 1 using a molar ratio of terephthalic acid to dimethylterephthalate of 65 to 35 and a 1.16% molar excess of hydrazine sulfate at 120° C. to provide a dope. The resulting dope was reaction spun to fiber at a speed of 237 ft. (72.2 m.)/min. using a 6.5 mil (0.1651 mm.), 5-hole spinneret at 80° C., a ½ inch (12.7 mm.) air space and water at 25° C. as the coagulation medium following the procedure of Example 1. The fiber had the following properties.

| | |
|---|---|
| Tenacity: | 5.8 gpd |
| Elongation: | 3.4% |
| Modulus: | 220 gpd |

EXAMPLE 7

A (p-phenylene/m-phenylene) oxadiazole/N-methyl terephthal/N-methyl isophthal)hydrazide copolymer ($\eta_{inh} = 2.9$) was prepared in fuming sulfuric acid (30% SO$_3$) similar to the procedure of Example 1 to 6 ½ hours at 120° C. using a 80 to 10 to 10 molar ratio of terephthalic acid (51.71 g.) to isophthalic acid (6.46 g.) to dimethylterephthalate (7.55 g.) and a 1.27% molar excess of hydrazine sulfate to provide a dope. The resulting dope was reaction spun to fiber as in Example 1 at a speed of 410 ft. (125 m.)/min. using a 8 mil (.2032 mm.), 5-hole spinneret at 90° C., an air space of ½ inch (12.7 mm.) and 13% aqueous sulfuric acid at 25° C. as the coagulation medium. The fiber had the following properties.

| | |
|---|---|
| Tenacity: | 5.1 gpd |
| Elongation: | 3.0% |
| Modulus: | 188 gpd |

EXAMPLE 8

A p-phenylene oxadiazole/N-methyl terephthalhydrazide copolymer ($\eta_{inh} = 2.8$) was prepared in fuming sulfuric acid (30% SO$_3$) in 5 ½ hours at 140° C. similar to the procedure of Example 1 using a 45 to 55 molar ratio of terephthalic acid to dimethylterephthalate and a 1.58% molar excess of hydrazine sulfate. Following the spinning procedure described in Example 1 the resulting polymer solution (i.e. dope) was reaction spun to fiber at a speed of 787 ft. (239.9 m.)/min. using an 8 mil (0.2032 mm.), 10-hole spinneret at 120° C., a ½ inch (12.7 mm.) air space and water as the spin bath coagulant. The fiber was neutralized with a 4% sodium carbonate solution prior to drying and hot-drawing at 409° C. The fiber had the following properties:

| | |
|---|---|
| Tenacity: | 9.0 gpd |
| Elongation: | 4.3% |
| Modulus: | 258 gpd |
| Denier/Filament: | 1.5 |

EXAMPLE 9

A p-phenylene oxadiazole/N-methyl terephthalhydrazide copolymer ($\eta_{inh} = 3.0$) was prepared in fuming sulfuric acid (30% SO$_3$) similar to the procedure of Example 1 by heating to 140° C. for 11 hours a mixture of reactants having a 25 to 75 molar ratio of terephthalic acid to dimethylterephthalate and a 1.59% molar excess of hydrazine sulfate to provide a dope. Following the spinning procedure described in Example 1 the resulting dope was reaction spun to fiber at a speed of 479 ft. (146 m.)/min. using an 8 mil (0.2032 mm.), 10-hole spinneret at 90° C., an air space of ½ inch (12.7 mm.) and water at 25° C. as the coagulant. The fiber had the following properties.

| | |
|---|---|
| Tenacity: | 7.4 gpd |
| Elongation: | 4.9% |
| Modulus: | 198 gpd |
| Denier Filament: | 1.3 |

EXAMPLE 10

A p-phenylene oxadiazole/N-methyl terephthalhydrazide copolymer ($\eta_{inh} = 3.6$) was prepared in fuming sulfuric acid (30% SO$_3$) similar to the procedure of Example 4 using a 75 to 25 molar ratio of terephthalic acid to dimethylterephthalate and a 1.2% molar excess of hydrazine sulfate to provide a dope. Following the procedure of Example 1 the resulting dope was reaction spun to fiber at a speed of 646 ft. (197 m.)/min., using an 8 mil. (0.2032 mm.), 10-hole spinneret at 167° C., an air space of ½ inch (12.7 mm.) and an acidic aqueous 40% solution of ammonium sulfate as the coagulant. The fiber was neutralized with sodium carbonate prior to drying and hot-drawing. The fiber had the following properties.

| | |
|---|---|
| Tenacity: | 9.4 gpd |
| Elongation: | 5.2% |
| Modulus: | 282 gpd |

EXAMPLE 11

This example illustrates the effect of using too much or too little hydrazine in preparing dopes.

A p-phenylene oxadiazole/N-methyl terephthalhydrazide copolymer ($\eta_{inh} = 4.0$) was prepared similar to the procedure of Example 1 in 5 ½ hours at 140° C. using a 75 to 25 molar ratio of terephthalic acid (45.0 g.) to dimethylterephthalate (17.76 g.) and a 3.3% molar excess of hydrazine sulfate (48.71 g.). The resulting very viscous dope could not be spun to good fiber because of the extreme dope viscosity. In a similar experiment using the same ratio of diacid to diester and no excess of hydrazine sulfate, a polymer was obtained having an inherent viscosity of only 0.8, a viscosity too low to yield a strong fiber upon spinning.

EXAMPLE 12

This example illustrates the advantage of dissolving the reactants prior to the major part of the polymerization reaction. A mixture of terephthalic acid (1245 g., 75 mole %), dimethylterephthalate (485 g., 25 mole %), and hydrazine sulfate (1313 g., 1% molar excess) in 35 pounds (15.88 kg.) of fuming sulfuric acid (20% $SO_3$) was stirred at room temperature for 19 hours. At this time all reactants had dissolved. The reaction mixture was heated with stirring at 100°–105° C. for one hour, then at 140° C. for 12 hours. The dope was diluted with 11 pounds (4.99 kg.) of fuming sulfuric acid (20% $SO_3$) prior to spinning. The polymer had an inherent viscosity of 3.3. The dope contained no gel particles and could be easily dry jet-wet spun to strong fiber.

In a similar experiment the same molar ratio of monomers was used but the reaction mixture was heated to the polymerization temperature of 140° C. without prior dissolution of the reactants. The resulting dope contained many gel particles and could not be spun successfully.

EXAMPLE 13-17

Examples 13–17 illustrate preferred embodiments of the invention whereby high tenacity, high modulus fibers are provided. In each Example the general procedure described in Example 1 was followed for the preparation of the dope and for the spinning of the dope to fibers with the exception that the reactants were dissolved in the oleum as in Example 12 prior to any substantial polymerization thereof. The specific conditions employed in each of these Examples are given in Table 1. Example 13 illustrates the preparation of fiber from a dope obtained by polymerization of the reactants at 144° C. to provide a polymerization product that was diluted with 20% oleum. The dope of Example 14 was prepared in the same manner except that a lower polymerization temperature (i.e. 137° C.) was employed. The dope of Example 15 was prepared in the same manner as the dope of Example 14 except that a higher solids concentration was employed during polymerization and the resulting polymerization product was diluted with sulfuric acid of 85% concentration rather than with 20% oleum. The dopes of Examples 16 and 17 were prepared directly without dilution of the polymerization product. In each instance the resulting dopes were reaction spun to high strength, high modulus fiber, the properties of which are given in Table 1. Surprisingly, dopes containing higher molecular weight polymer can be prepared by the dilution technique than can be prepared without dilution. In conventional solution polymerization polymer concentration has little effect on the molecular weight ($\eta_{inh}$) of the resulting polymer. However, in preparing the dopes described therein polymer concentration plays an important role, for example, in 20% oleum a polymer concentration of about 7.5% is required to reach a polymer inherent viscosity of about 4.0 at a polymerization temperature of 137° C. in 6 hours. At this concentration, however, the Brookfield viscosity of the polymerization product is too high to be easily spun to fiber by conventional techniques. Therefore, the dilution technique illustrated in Examples 13 and 14 is used to provide not only spinnable dopes but dopes which contain higher molecular weight polymer at a given polymer concentration than is obtainable without dilution. The molecular weight of the polymer in the dope of Example 15 wherein aqueous sulfuric acid is used as the diluent is somewhat lower than in Examples 13 and 14 wherein oleum was used.

Table 1

| Example No. | 13 | 14 | 15 | 16 | 17 |
|---|---|---|---|---|---|
| Polymer Reaction Conditions | | | | | |
| Molar Ratio of TA:DMT | 50/50 | 50/50 | 40/60 | 50/50 | 50/50 |
| Oleum, % $SO_3$ | 20 | 20 | 20 | 20 | 20 |
| $SO_3$ Theoretically Utilized During Polymerization, % | 60 | 60 | 50 | 38 | 60 |
| Excess Hydrazine Sulfate, % | 4.0 | 1.5 | 1.5 | 1.5 | 1.5 |
| Polymer Concentration of Undiluted Dope, % | 6.5 | 7.5 | 8.0 | 4.9 | 7.0 |
| Polymer Concentration of Diluted Dope, % | 3.0 | 2.4 | 6.5 | — | — |
| Diluting Agent | 20% oleum | 20% oleum | 85% $H_2SO_4$ | | |
| Reaction Time, hrs. | 6 | 6.5 | 6.5 | 4 | 7 |
| Reaction Temperature, ° C. | 144 | 137 | 137 | 137–140 | 149 |
| Inherent Viscosity of Polymer in Dope | 3.8 | 4.0 | 2.8 | 3.1 | 3.1 |
| Brookfield Viscosity of Spinning Dope, poise | 2,320 | 960 | 6,000 | 3,920 | 18,360 |
| Spinning Conditions | | | | | |
| Extrusion Speed, ft./min. | 25.7 | 20.0 | 15 | 15 | 284 |
| m./min. | 7.8 | 6.1 | 4.6 | 4.6 | 86.6 |
| Wind-up Speed, ft./min. | 2142 | 1603 | 1236 | 1066 | 1435 |
| m./min. | 652.9 | 488.6 | 376.7 | 324.9 | 337.4 |
| Jet Stretch | 7.0 | 12.0 | 15.0 | 10.0 | .44 |
| Cascade Stretch | .55 | .97 | .88 | .75 | .74 |
| Hot Stretch | 21.1 | 6.9 | 6.1 | 9.4 | 15.3 |
| Hot Stretch Temperature, ° C. | 374 | 402 | 377 | 366 | 361 |
| Total Stretch | 83 | 80 | 82 | 71 | 5.1 |
| Spinneret Capillary Diameter, mil. | .8 | 12 | 12 | 8 | 3 |
| mm. | .2032 | .3048 | .3048 | .2032 | .0762 |
| Fiber Properties | | | | | |
| Tenacity, g/den | 16.3 | 15.4 | 14.6 | 13.2 | |

Table 1-continued

| Example No. | 13 | 14 | 15 | 16 | 17 |
|---|---|---|---|---|---|
| Elongation, % | 6.7 | 6.3 | 6.3 | 5.9 | 6.5 |
| Modulus, g/den | 297 | 387 | 347 | 309 | 280 |
| Toughness, g.cm/den.cm. | .53 | .50 | .49 | .45 | .45 |
| Inherent Viscosity of Fiber Polymer | 2.7 | 2.7 | 2.2 | 2.4 | — |

EXAMPLE 18

This Example illustrates the preparation of high tenacity fiber by the reaction spinning process of the present invention wherein the spinneret is immersed in the coagulating liquid.

A polymer solution was prepared similar to the procedure used in Example 1 from a 50 to 50 molar ratio of terephthalic acid (1245.5 g.) to dimethylterephthalate (1456.2 g.) dissolved in 20% oleum (62 lbs. 28.12 kg.) using a 1.5% excess of hydrazine sulfate. The reaction was carried out at 137° C. for 6.5 hours. The resulting reaction mixture was diluted with 20% oleum to a polymer concentration of 2.5% to provide a dope with a polymer inherent viscosity of 4.2. This dope was reaction spun to fiber through a 25 hole, 10 mil (.254 mm.) spinneret which was immersed in the water used as a coagulation bath. Fiber, processed as in Example 1, was collected at a wind-up speed of 1484 ft./min. (452.3 mpm) and had the following tensile properties.

| Tenacity: | 12.4 gpd |
|---|---|
| Elongation: | 6.1% |
| Modulus: | 285 gpd |
| Toughness | .40 g. cm./den. cm. |

EXAMPLE 19

This example illustrates the preparation of tire cord from fiber of p-phenylene oxadiazole/p-phenylene N-methylhydrazide copolymer.

Nominal 1500 denier yarn having an average T/E/M of 11.2 gpd 6.0%/240 gpd was prepared similar to the procedure used in Example 16. This yarn was twisted to 7 turns per inch (tip) (275.6 turn per meter-tpm) to provide a strand. Two such strands were then twisted together with a twist of 7 tpi in the opposite direction to provide a balanced tire cord (1500/2,7 × 7) having a T/E/M of 10.3 gpd/7.6%/147 gpd.

A 1500/2,7 × 7 cord similar to the above cord was prepared from fiber made using the procedure of Example 14 with the exception that in this instance the mole ratio of TA to DMT was 75:25 instead of 50:50. This cord was used in the belt of a G78-14 bias-belted tire which was tested on a cobblestone track along with two other G78-14 bias-belted tires, one having an equal strength belt of steel and the other having an equal strength belt of glass. After 5940 laps (594 miles; 955.9 kilometers), there was no apparent damage to the cords made of the fiber of the present invention, whereas the steel and glass cords showed considerable damage.

A 1500/2,11 × 11 tire cord (11 tpi = 449 tpm) made from fiber prepared according to the procedure of Example 14 was used as the reinforcing cord for the carcass of JR 78-15 monoply radial steel-belted tires. In laboratory wheel testing one of these tires was inflated to 20 psig (2.3609 atm.) run for 21,000 miles (33,795.3 km.) at 50 mph (80.5 kilometers/hr.) under a load of 1860 lbs. (843.9 kg.) at 100° F. (38° C.) without cord failure. Another of these tires was run for 13,275 miles (21,363.5 kilometers) under the same testing conditions.

The carcass cords were then removed from the tire and the tenacity thereof determined. It was found that the cords retained 90% of their original tenacity after 13,275 miles which demonstrates that the cords possess good fatigue resitance.

EXAMPLE 20

This Example establishes that the chemical composition of Copolymer A and Copolymer B are different and that a major copolymeric unit in Copolymer A is the N-alkyloxadiazolium hydrosulfate unit, i.e.

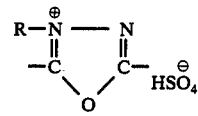

A dope was prepared similarly to the procedure used in Example 13 from a 50:50 molar ratio of terephthalic acid (1122.9 g.) to dimethylterephthalate (1312.4 g.) employing a 1.5% molar excess of hydrazine sulfate (1785.3 g.) in 25% oleum. A 4 hour reaction time at 137° C. was used. After dilution with 74% sulfuric acid and oleum a spinnable dope was obtained of a copolymer having an inherent viscosity of 2.3. A sample of this dope was analyzed by proton and $C^{13}$ nuclear magnetic resonance (NMR). The following relevant signals were observed:

| Proton | NMR (34° C.) (60 MHz) | 5.10 ppm | | 4.13 ppm |
|---|---|---|---|---|
| $C^{13}$ | NMR | 190.7 ppm | 190.7 ppm | 118.1 ppm |

In the proton NMR the signal at 5.10 ppm was demonstrated to be different from that obtained from methyl hydrazine sulfate (4.13 ppm). In the $C^{13}$ NMR spectrum the signals at 192.5, 190.7, and 188.1 ppm downfield from an external standard, hexafluoroisopropanol, were interpreted to result from the carbon atoms of N-substituted and unsubstituted oxadiazole units. The positioning of the signal at 192.5 ppm for the N-unsubstituted unit was confirmed by the $C^{13}$ NMR spectrum of authentic Poly(p-phenylene oxadiazole) in oleum. The other absorptions are attributed to the N-methyl oxadiazolium hydrosulfate because of their proximity to the oxadiazole absorption at 192.5 ppm. Since N-methyloxadiazolium hydrosulfate units are unsymmetrical two signals were expected and actually obtained, thereby confirming their structure. The dope was reaction spun into water and a fiber of good tensile properties was obtained. It was chemically analyzed and found to consist of 51.5 mole % p-phenylene oxadiazole and 48.5 mole % p-phenylene N-methylhydrazide units. The fiber polymer had an intrinsic viscosity of 1.95. In contrast, when dissolved in concentrated sulfuric acid, an intrinsic viscosity of only 0.1 was obtained. This illustrates the instability of the fiber polymer (Copolymer B) in sulfuric acid. Upon proton NMR analysis of the fiber polymer in 93% sulfuric acid, a signal at 4.42 ppm was initially observed indicating the protons of the methyl group attached to the N-methyl hydrazide polymer linkage. Within a few minutes this signal vanished and a signal at 4.13 ppm was observed, which signal resulted from methyl hydrazine sulfate obtained as a fiber polymer degradation product. The differing signals of the initial spectra of the fiber dissolved in 98% sulfuric acid and the dope polymer with 98% sulfuric acid as its solvent demonstrate the different chemical structure of dope and fiber polymer.

EXAMPLE 21

A m-phenylene oxadiazole/N-methyl isophthalhydrazide copolymer ($\eta_{inh}$ = 2.3) was prepared at 142° C. with a reaction time of 6 hours in fuming sulfuric acid (40% $SO_3$) similar to the procedure of Example 1 using a 50 to 50 molar ratio of isophthalic acid (1210.8 g.) to dimethyl isophthalate (1415.1 g.) with a 1.5% molar excess of hydrazine sulfate (1925.1 g.) to provide a dope with a polymer concentration of 12.2%. A total of 14,575 g. of fuming sulfuric acid (40% $SO_3$) was used for the reaction. The resulting dope was reaction spun to fiber by extruding it through a 4 mil. (0.1016 mm.), 25 hole spinneret into an air space of ½ inch (1.27 cm) and then into water at 25° C. After using a spinning procedure similar to that of Example 1, white, lustrous fiber was wound up on a bobbin at a speed of 859.3 ft./min. (265 m./min.). The fiber had good tensile properties.

I claim:

1. A process for preparing fiber of a random copolymer consisting essentially of recurring units of the formulas

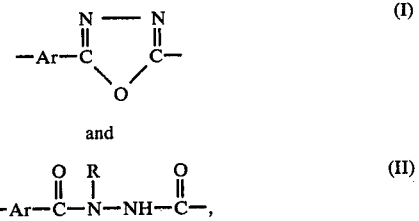

and

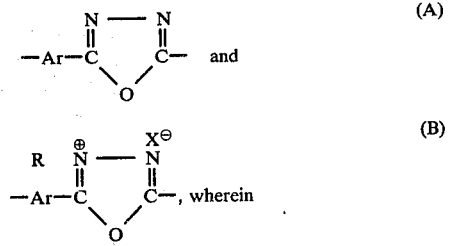

wherein Ar is arylene and R is lower alkyl and wherein the mole ratio of units (I) to units (II) is between 20:80 and 95:5 comprising (1) extruding a spinning dope into an aqueous coagulation medium, said dope consisting essentially of
 (a) a random copolymer having an inherent viscosity of at least 2.0 and consisting essentially of recurring units of the formulas (A)

(B)

$X^-$ is an anion contained in said dope and Ar and R have the same meaning as above and wherein the mole ratio of units (A) to units (B) is between 20:80 and 95:5 and (b) a solvent consisting essentially of oleum or sulfuric acid of at least 90% concentration;

(2) reacting said copolymer of the dope with water present in said aqueous coagulation medium and obtaining said copolymer consisting essentially of units (I) and (II) in the shape of a fiber;

(3) withdrawing said fiber from said coagulation medium;

(4) washing said fiber with water and an aqueous alkaline solution to remove and/or neutralize sulfuric acid which is in contact therewith; and (5) drying said fiber.

2. The process of claim 1, wherein said solvent consists essentially of concentrated sulfuric acid.

3. The process of claim 1, wherein said solvent consists essentially of oleum.

4. The process of claim 1, wherein Ar is

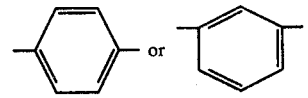

and may be the same or different in successive units and R is methyl or ethyl and may be the same or different in successive units (II).

5. The process of claim 1, wherein said aqueous coagulation medium consists essentially of sulfuric acid having a concentration between 40% and 60%.

6. The process of claim 1, wherein the mole ratio of units (I) to units (II) and units (A) to units (B) is between 40:60 and 80:20.

7. The process of claim 1, wherein the aqueous coagulation medium is maintained at a temperature between 0° C. and 95° C.

8. The process of claim 1, wherein the temperature of the dope as it is extruded is between about 20° C. and 140° C.

9. The process of claim 4 wherein Ar is

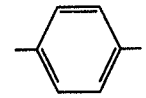

and R is —$CH_3$.

10. A method for forming a fiber of polyoxadiazole series resin consisting essentially of the following recurring units:

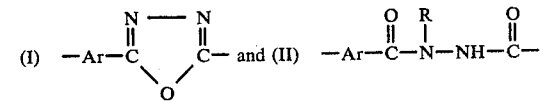

where Ar is an arylene and R is a $C_1$ to $C_4$ alkyl, which comprises introducing a resin solution of 2 to 15% by weight in sulfuric acid of 100 to 109% by weight concentration through an opening of predetermined cross-section into a coagulation bath selected from the group consisting of:

(1) 15 to 68% by weight of aqueous solution of sulfuric acid, and (2) acidic aqueous solution of ammonium sulfate and then washing the coagulated fiber with water and allowing it to come in contact with an aqueous solution of sodium carbonate, further washing with water and drying it.

* * * * *